UNITED STATES PATENT OFFICE.

FREDERICK W. OLIVER, OF 37 HUDDART STREET BOW, COUNTY OF MIDDLESEX, ENGLAND.

METHOD OF PRODUCING COLORED TRANSPARENCIES.

SPECIFICATION forming part of Letters Patent No. 393,919, dated December 4, 1888.

Application filed April 25, 1887. Serial No. 236,060. (No specimens.)

*To all whom it may concern:*

Be it known that I, FREDERICK WEAVER OLIVER, a subject of the Queen of Great Britain, residing at 37 Huddart Street Bow, in the county of Middlesex, England, lithographer, have invented an Improved Method of Producing Colored Transparencies; and I do hereby declare that the following is a full, clear, and exact description of the invention, which will enable others skilled in the art to which it appertains to make and use the same.

This invention has for its object the production of colored transparencies in substitution for and in imitation of painted or stained glass in a very effective manner and at a moderate cost.

In order to carry out this invention, I print on paper (prepared as hereinafter described) the design in very powerful colors, and when this impression is dry I varnish same, and I also varnish the glass or other suitable transparent substance employed upon which the design is to be produced, and when both the varnishes are dry, or nearly so, I lay the impression on the glass or other substance, which has been previously varnished, as aforesaid, and press it well down, taking care to press out any air-bubbles that may have formed between the paper and the glass or other substance. I then heat the glass or other substance sufficiently to cause the varnish to become "tacky," and then rub the impression well down, and when the glass or other substance is cold the paper is wetted and taken off, and the whole of the design will be fixed on the glass or other substance in transparent colors. I then well wash the glass or other substance employed to thoroughly remove any composition that may have left the paper with the transferred colors and wipe it dry, after which I subject it to a good heat—say 200° Fahrenheit—to harden the varnishes. I then varnish it on the printed side and again bake, and then polish it for better protection.

The paper aforesaid, upon which I first print the design in colors for fixing to the glass or other substance, I prepare as follows: I take plate or half-plate paper, (preferably the latter,) not too stout, and give it two coats of starch prepared with boiling water and a coating of gum-arabic dissolved in water, after which I highly roll the paper thus prepared.

By the above method I am enabled to produce a very effective imitation of permanently stained or painted glass without having any paper fixed thereto, and at the same time I do not require to subject the glass (when this is employed) to pressure which would break it, and I obtain by this method perfect finished transparencies without the necessity of any touching up or painting and great rapidity of production.

Having fully described my invention, what I desire to claim and secure by Letters Patent is—

1. The method of producing colored transparencies, consisting of preparing the surface of paper with a coating of starch and gum, highly rolling the paper, printing the design upon the prepared surface in colors, varnishing the same over, and when dry placing it upon a sheet of glass or other suitable transparent substance, previously varnished and allowed to dry, varnish to varnish, then heating the whole until the varnishes become tacky, then rubbing the paper to attach the varnishes together, when cold wetting the paper to remove it and cleaning away from the design any of the composition of starch and gum that may adhere to it, and after drying again heating the whole to harden the varnishes, and finishing by revarnishing, all substantially as hereinbefore described.

2. In a method of producing colored transparencies, attaching two coats of varnish together by heat, one coat being upon a sheet of glass or other transparent substance and the other on paper over printing, pressing the two coats of varnish together when they become tacky by heat, and afterward hardening the two varnishes by a second application of heat, as hereinbefore described.

F. W. OLIVER.

Witnesses:
THOMAS E. HALFORD,
THOMAS IVES.